April 21, 1936.  A. C. BROUN  2,037,694
MEASURING DISPENSER
Filed April 29, 1935
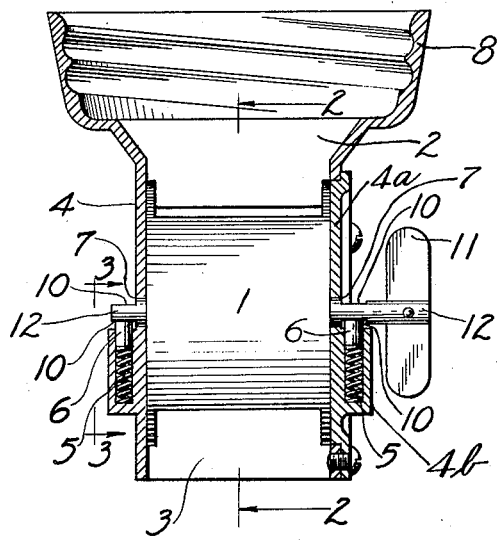
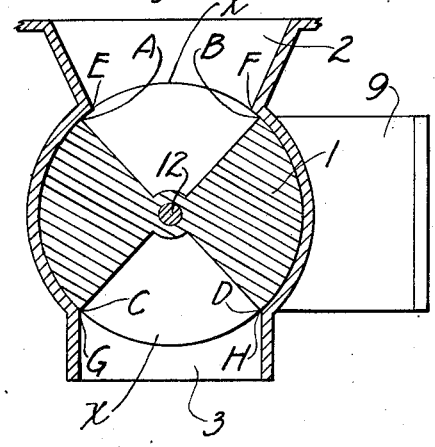
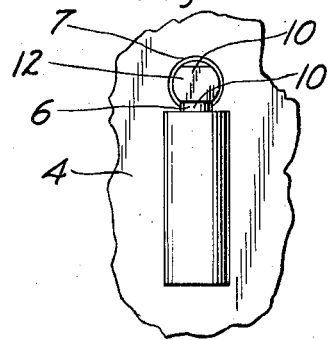
INVENTOR.
Archibald C. Broun
BY
Williamson & Williamson
ATTORNEYS Patented Apr. 21, 1936

2,037,694

UNITED STATES PATENT OFFICE 2,037,694

MEASURING DISPENSER

Archibald C. Broun, Cook, Minn., assignor to Marjorie Wilkinson, Cook, Minn.

Application April 29, 1935, Serial No. 18,746

5 Claims. (Cl. 221—106)

This invention relates to devices for dispensing measured quantities of materials, such as granular and liquid substances.

It is an object of my invention to provide an extremely simple, but highly efficient measuring dispenser which is compact in form and can be manufactured at low cost.

A further object is the provision of a measuring dispenser wherein a complete and efficient seal is formed between the movable part of the device and the housing for the same.

It is a more specific object to provide a device for dispensing measured quantities of material comprising a housing including a receiving or hopper portion and a rotating or oscillatory measuring element journaled in said housing below the hopper portion and so journaled and mounted as to maintain a correct and efficient sealing relation with the housing throughout a long period of continued use.

Another object is the provision of a simplified device of the class referred to having a receiving or hopper portion at its upper end adapted to readily connect with and retain a conventional receptacle in inverted position, such as a Mason jar.

These and other objects and advantages of the invention will more fully appear from the following description, made in connection with the accompanying drawing, wherein like reference characters refer to the same or similar parts throughout the various views, and in which:—

Fig. 1 is a vertical section taken axially of the rotary measuring element through the housing of the device;

Fig. 2 is a vertical section taken substantially along the line 2—2 of Fig. 1, and Fig. 3 is a fragmentary detail view in elevation showing my means for mounting one end of the shaft of the rotary measuring element to insure perfect sealing.

The embodiment of my invention as illustrated comprises a casing or housing having parallel sides between which is mounted a rotary measuring element 1 of general cylindrical shape. Rotary element 1 has a pair of oppositely disposed measuring chambers X formed therein as shown of sector shape and extending from planes adjacent the ends of rotary member 1 and leaving narrow guiding flanges at such ends. The front and rear walls of the casing are contoured concentrically to snugly fit the cylindrical peripheral surface of rotary element 1 leaving merely working clearance.

The two measuring chambers are adapted to alternately receive material from the receiving hopper 2 of the housing and to discharge material through a discharge passage or chute 3 below rotary element 1. The circumferential length of the measuring chamber openings, as indicated by the letters A—B and C—D respectively, is slightly less than the length of the closed portions of rotary element 1, A—C and B—D respectively. Housing or casing No. 4, as has been stated, fits the rotating element 1 closely and is provided at one of its sides, as shown, with a detachable plate 4a having an attachment flange for securance to the housing. When plate 4a is removed element 1 may be inserted within the housing through the opening which said plate covers. The shaft of the cylinder or rotary element 12 is supported at its ends indirectly upon springs 5 which are received in suitable vertical sockets 4b provided at opposite sides of the housing and plungers 6 are interposed between the upper ends of said springs and the trunnions or ends of shaft 12, as clearly shown in Fig. 1. The extremities of the shaft, it will be noted, are somewhat reduced from the journal portions proper and said journal portions are disposed in apertured bearings formed in the opposite sides of the housing, the apertures 7 being of slightly larger circumference than that of the journal portions of the shaft. The said cylinder is thereby constantly urged upwardly by light tension into close contact with the concentrically shaped outer casing forming an efficient seal for the receiving hopper 2. The upper portion of the hopper as shown is provided with a cup-shaped flange 8 internally threaded to receive the threaded neck of a Mason jar or the like, such jar or container acting as a storage reservoir for the material to be dispensed.

An attachment bracket 9 is shown consisting in a plate with a T-head for reception in a slotted socket for securance to a vertical supporting surface in various manners and is provided rigidly attached to the rear wall of housing 4. The extremities of shaft 12 are flatted on opposing sides to check rotation of the cylinder 1 when the openings A—B or C—D as the case may be are disposed respectively below the receiving hopper.

The width of the discharge chute or passage between the points G—H (see Fig. 2) is substantially similar to the width of the open portion of measuring chambers A—B and C—D of rotary part 1 and it will be noted also that the width of the discharge end of the receiving hopper 2 between the points E—F is somewhat less than the circumferential widths A—B and C—D respectively of the measuring chambers of the rotary cylinder so that the concentric portions E—F and F—H of the casing or housing are greater in circumferential height than the closed circumferential portions A—C and B—D of rotary element 1 and consequently greater than the open portions A—B and C—D of part 1 and thus forming a seal for the material in the receiving hopper.

A handle or finger piece 11 for rotating the shaft 12 is provided at one end thereof.

From the foregoing description it will be seen that I have provided a very simple, but highly efficient, measuring dispenser which may be manufactured at low cost. The light upward pressure exerted on the trunnions or ends of shaft 12 by the spring pressed plunger 6 causes the cylindrical peripheral wall of measuring element 1 to form a tight seal with the cooperating cylindrical surfaces E—G and F—H preventing granular material or liquid from being forced between the rotary and stationary elements of the device.

The flatted portions 10 on the trunnions index the sealing positions of the rotary element.

For cleaning, the plate 4a may be easily removed and the rotary element 1 thereafter taken out.

It will, of course, be understood that various changes may be made in the form, details, proportions and arrangement of the parts, without departing from the scope of my invention, which generally stated, consists in a device capable of carrying out the objects above set forth and in the novel parts and combinations of parts disclosed and defined in the appended claims.

What is claimed is:—

1. A measuring dispenser comprising a casing having a receiving or hopper portion at the upper end thereof, and having a central portion in communication therewith including a pair of parallel walls and a pair of opposing sides, the inner surfaces of which are segments of a cylinder concentrically arranged, a measuring element of generally cylindrical form mounted within said central portion and having ends disposed snugly between said parallel walls, said measuring element having a measuring chamber formed therein extending from the peripheral surface inwardly, means for journaling said measuring element for rotation and means for urging said measuring element upwardly under light pressure to cause the peripheral surface at the upper portion of said element to form a tight seal with said cylindrical surfaces of said housing.

2. A measuring dispenser comprising a casing having a receiving portion at the upper end thereof and having a central portion in open communication with said receiving portion, a measuring element of general cylindrical form mounted within said central portion, said central portion having opposed cylindrically segmental surfaces closely cooperating with the cylindrical exterior surface of said measuring element to form a seal for said receiving portion, said measuring element having trunnions loosely journaled in said casing and means outside of said casing for urging said trunnions upwardly under light pressure to cause said element to form a tight seal against the cooperating surfaces of said central portion.

3. The structure set forth in claim 2, said means comprising spring actuated plungers pressing against the under sides of said trunnions.

4. The structure set forth in claim 2, said means comprising spring pressed plungers pressing against the under sides of said trunnions, said trunnions each having at least one flatted portion to index the initial or loading position of said measuring element.

5. A measuring dispenser comprising a casing having a receiving or hopper portion at the upper end thereof, and having a central portion in communication therewith including a pair of parallel walls and a pair of opposing sides, the inner surfaces of which are segments of a cylinder concentrically arranged, a measuring element of generally cylindrical form mounted within said central portion and having ends disposed snugly between said parallel walls, said measuring element having measuring chambers formed therein extending from the peripheral surface inwardly, means for journaling said measuring element for rotation, said measuring element having an axial pin extending through one of said parallel walls, said pin having flatted surfaces correspondingly arranged with the disposition of said measuring chambers relative to said measuring element and yieldable means engageable with said flatted surfaces.

ARCHIBALD C. BROUN.